United States Patent [19]

Gold et al.

[11] 3,783,293

[45] Jan. 1, 1974

[54] REGISTER CONTROL SYSTEMS

[75] Inventors: Daniel Gold, London; Geoffrey David Clinton, Garston, both of England

[73] Assignee: Crosfield Electronics Limited, London, England

[22] Filed: Mar. 10, 1972

[21] Appl. No.: 233,506

Related U.S. Application Data

[63] Continuation of Ser. No. 28,394, April 4, 1970, abandoned.

[30] Foreign Application Priority Data

Apr. 17, 1969 Great Britain .................... 19741/69

[52] U.S. Cl. ................................ 250/548, 226/45

[51] Int. Cl. ........................................... H01j 39/12

[58] Field of Search ................. 250/219 DR, 219 D, 250/219 F, 214; 226/28, 29, 30, 31, 45

[56] References Cited

UNITED STATES PATENTS 3,439,176 4/1969 Astley .......................... 250/219 DR 3,399,306 8/1968 Guastavino.................. 250/219 DR 3,027,462 3/1962 Helmes........................ 250/219 DR

*Primary Examiner*—James W. Lawrence
*Assistant Examiner*—D. C. Nelms
*Attorney*—Solon B. Kemon

[57] ABSTRACT

In a method of register control two or more register marks, corresponding to different operations performed on the web, are printed on the web, one behind the other in a track extending in the direction of travel of the web, the marks being separated from one another by a predetermined distance when register is correct. A mark is recognised when a photocell signal indicates clear space in the track for a predetermined distance (longer than the nominal separation between the marks) followed by the leading mark. It may also be required for recognition that the mark thickness is less than a given amount and that the mark is followed by at least a predetermined length of clear space. When a mark is recognition, a register comparison is made between the positions in the track of the leading mark and the next mark. The circuit discriminator against others print in the track and other register marks behind the two compared marks.

3 Claims, 3 Drawing Figures

Figure 1:
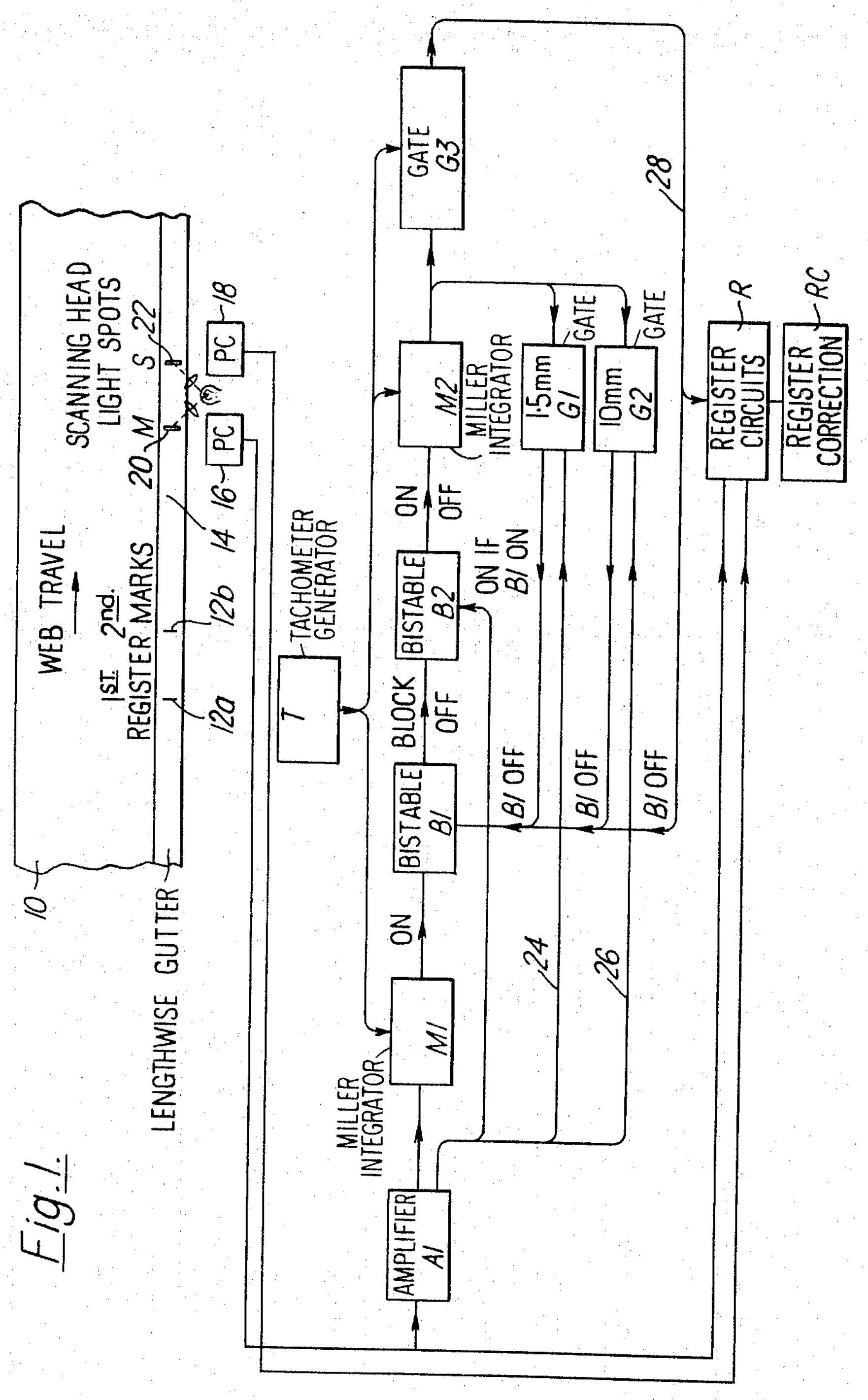

Inventors
Daniel Gold
Geoffrey David Clinton
By
Kemon, Palmer & Estabrook
Attorney Inventors
Daniel Dora
Geoffrey David Clinton
By
Kemon, Palmer & Estabrook
Attorneys

REGISTER CONTROL SYSTEMS

This application is a continuation of Ser. No. 28,394 filed Apr. 4, 1970, now abandoned.

When a continuous web of paper is printed with a succession of similar images and other operations are to be performed on the web in positions controlled by the positions of the first images, some form of register control becomes necessary. An example of such a system is a multi-colour press in which the subsequent colour component images which are printed on the web must be maintained in register with the first colour component image. Register control is normally carried out by printing register marks on the web and using light-sensitive cells to detect the passage of these marks.

One of the most awkward practical problems of a photo-electric register control is to arrange that the error-measuring circuits are controlled by the register marks only and not by the remainder of the print. Even a clear strip of paper running along the edge of the web and containing only the register marks would require some form of discrimination between marks when there were more than two marks and it is normally impractical to have this arrangement because paper is expensive and printers are not prepared to provide margins which are used only for the register marks.

In an alternative arrangement the register marks are printed in an area between the picture areas on the web or in a strip which carries other printer's marks and a small impulse generator is coupled to the printing press and is used to switch on and off the photocell circuits at moments such that they are only effective when they are scanning the transverse strip of the web in which the register marks are to be expected. This prevents the photocell from being influenced by other marks in the track of the register marks but requires that, in order to accommodate different webs, it is necessary for the printer to align the impulse generator with respect to the photocell and register marks at the beginning of each printing run.

In most cases it is necessary to run the press and obtain approximate colour register manually, stop the press and synchronise the gate generators and then restart the press. Since there is a gate generator for each pair of colours, this operation consumes time and produces waste material due to the run up and down of the press. Additionally, there is the possibility on gravure presses of the web sticking to the printing cylinder, thus causing web break and further down-time and waste material.

The present invention has for its object to make this pre-alignment unnecessary and thus to save press time and material.

One approach to this problem which has been proposed is to print a number of register marks as a code and then to use logic circuits to determine when this code of marks has passed the sensing head. However, this involves a larger number of marks on the web in order to form a recognisable code.

The present invention is concerned with an arrangement of register marks in which two or more register marks, corresponding to different operations performed on the web, are printed on the web, one behind the other in a track extending in the direction of travel of the web, the marks being separated from one another by a predetermined distance when register is correct; according to the invention, register control is effected by sensing the presence of clear space in the said track on the moving web for a predetermined distance longer than the said predetermined separation between the marks; sensing the presence of a leading mark in the track following the said predetermined distance of clear space; and in response to the recognition of such a mark after the clear space, placing a comparator system in condition to make a register comparison between the positions of the leading mark and a subsequent mark; and making a register correction in response to any register error signal from the comparator system. In other words, the detector means recognises the leading mark and enables the comparator system to consider the register condition of the subsequent mark in relation to the leading mark. Typically, the detector means may respond to a clear space of at least 40mm. (for a nominal mark separation of 20mm.) The discrimination of the detector means may be improved if it is made to respond only when, following the 40mm. of clear space, a mark of thickness not greater than a predetermined amount (typically 1½mm.) is sensed, and the discrimination is further improved if as a further condition for recognition there must be at least a predetermined length of clear space (typically 10mm.) following the mark. If this combination of features is sensed by the detector head, then a gate is opened to permit the passage of signals derived from a further sensing of the leading register mark and a first sensing of the subsequent register mark.

An advantage of the method embodying the present invention is that the same photocell can be used to provide recognition and register signals. As an example, suppose that two light spots are projected on to the moving web with a spacing in the direction of web movement equal to the space between register marks on the web, and two photocells are arranged to detect the passage of the register marks through respective light spots. When the leading mark (which will be called the second mark for reasons which will become apparent later) reaches the first light spot the corresponding photocell will generate a signal which will be used for recognition purposes. If the "recognition criteria" are met, the register comparator circuits are put into operative condition. The leading or second mark reaches the second photocell when the trailing or first mark reaches the first photocell, if the marks are in register. The signals from the first and second photocells are then applied as register signals to the comparator circuits.

In applying the invention to four-colour printing, the first and second register marks are printed with a nominal separation of 20mm. so as to leave at least 80mm. of clear paper ahead of the leading or second mark. The leading mark is identified and enables the register comparison circuits as described above. When the third mark is printed, it is printed ahead of the first and second marks, in the direction of travel of the web, and thus becomes the new leading mark, which will generate a recognition signal in the first photocell of the corresponding scanning head. This leaves at least 60mm. of clear space ahead of this third mark.

The third mark is considered against the recognition criteria including the clear space ahead of it and enables the register comparison system to compare the register condition of the third mark with the second register mark, next behind it. In a similar way, the fourth register mark is printed ahead of the third mark by a distance which is nominally 20mm. thereby leaving at least 40mm. ahead of the fourth mark. The fourth mark then becomes the leading mark and is considered against the recognition criteria, including this clear space ahead of it, and enables the register comparison system to compare the positions of the fourth and third marks.

In our preferred form of apparatus for carrying the invention into effect, the mark recognition circuits are such that register marks after the leading mark are ignored, assuming that the leading mark has satisfied the recognition criteria. Thus the recognition apparatus discriminates against previously printed register marks.

In order that the invention may be better understood, a diagram illustrating apparatus embodying the invention will now be described with reference to FIG. 1 of the accompanying drawings. FIG. 2 of the drawings shows waveforms produced by elements of the circuit shown in FIG. 1.

Figure 2:
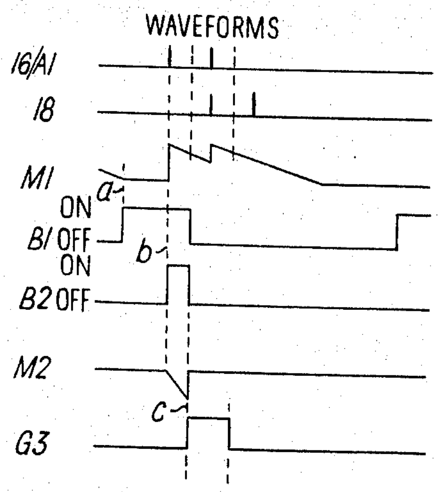

In FIG. 1, the web 10 is shown with two register marks 12*a* and 12*b* printed along a longitudinal track 14 with a predetermined separation of 20mm. A scanning head includes two photocells 16 and 18 at the same predetermined longitudinal separation and a lamp and lenses which project light spots 20 and 22 on to the web. The light spots are at the same predetermined longitudinal separation as the register marks. The output of the leading photocell 16 is applied to an amplifier A1. Waveforms for the circuit blocks of FIG. 1 are shown in FIG. 2. When white paper is scanned by the photocell 16 the amplifier A1 gives no output and the Miller integrator circuit M1, controlled by the amplifier A1, is permitted to run down at a rate proportional to the web speed, this rate being controlled by a tachogenerator T which is driven at a speed such that an output proportional to web speed is derived. If the photocell 16 scans 40mm. of white paper, the Miller integrator circuit runs down to a value such that the bistable circuit B1, to which it is connected, is switched on. This moment has been reached at point *a* in the waveform diagram in FIG. 2. With bistable circuit B1 switched on, bistable circuit B2 is in a condition such that it switches on in response to any output signal from amplifier A1 indicating that the photocell 16 is scanning printed matter. This moment is reached at point *b* in the waveform diagram, from which it will be seen that the signal from amplifier A1 also restarts the Miller integrator M1 from its upper level. When circuit B2 switches on it starts a second Miller integrator circuit M2, the rate of rundown of which is again controlled by the web speed signal derived from the tachogenerator T and the output of which is applied to three gates G1, G2 and G3.

If after the passage of 1½mm. of web, following the leading edge of the detected print, amplifier A1 is still giving an output signal, then it is known that the print which causes B2 to switch on is too thick to be a register line and gate G1 (which is controlled by circuit M2 and receives the signal from amplifier A1 by way of line 24) switches off the bistable circuit B1 and thereby restarts the system. The gate circuit G1 may be a single-transistor circuit which is switched on in the presence of a print signal if the output signal from the Miller integrator has an appropriate level (in this example, if the Miller output corresponds to more than 1.5mm.) If, however, there is no output from amplifier A1 after the passage of 1½mm. from the leading edge of the print (as assumed in the waveform diagram), the Miller integrator M2 continues to run down.

If there is a further output from amplifier A1 before the passage of 10mm. of web, the resulting signal applied by way of line 26 to the gate G2 causes the gate G2 to switch off bistable circuit B1 and re-start the system. This is because there should be at least 10mm. of clear space after the register mark. If this clear space exists, as assumed in the waveform diagram, then the Miller integrator circuit M2 runs down to an extent that it switches on an output gate G3 which enables the register circuit R to operate. Gate G3 also acts to switch off bistable circuit B1 by way of line 28. This moment is reached at point *c* in the waveform diagram. The register circuits receive signals from the two photocells 16 and 18 and act in the usual way to provide an error signal when the spacing between the register marks indicates a register error. This register error signal is applied to an automatic register correction system RC of known design. For example, it may employ circuits of the kind shown in our British Patent Specification No. 641,830 and may effect register corrections by the adjustment of the position of an intermediate roller between two printing cylinders to increase or decrease the path length between the two cylinders.

Figure 3:
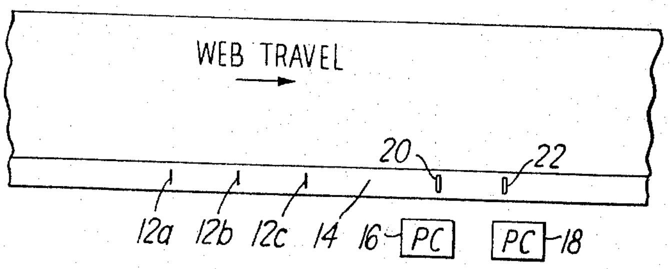

FIG. 3 shows how when a third operation on the web is to be registered with the first two, the third register mark 12*c* is placed ahead of marks 12*b* and 12*a* in the direction of the web, so that the photocell 16 will encounter the mark 12*c* before it senses the marks 12*b* and 12*a*. Thus the detector means responds to mark 12*c* and the register comparison is between marks 12*c* and 12*b*. The sensing of mark 12*c* by photocell 16 starts the rundown of the Miller circuit M1 and the subsequent sensing of marks 12*b* and 12*a* by photocell 16 serves only to restart the Miller circuit M1 from its upper level without affecting the operation of circuits B1, B2, M2 and G3. The recognition circuit will only respond if circuit B2 can be switched on in response to a mark signal from the amplifier A1, and circuit B2 can only be switched on if circuit B1 is already switched on, that is to say if the mark has been preceded by a length of clear space greater than the separation between register marks. Consequently the recognition circuit responds only to the leading mark and ignores those that follow.

We claim:

1. A method of web register control for registering more than two successively printed marks corresponding to more than two successively printed marks corresponding to more than two successive operations performed on the web, comprising: printing on a web two register marks one behind the other in a track extending in the direction of travel of the web alongside the area of the web to be printed, the marks corresponding to first and second operations performed on the web and being separated from one another by a predetermined distance when register is correct; sensing the presence of clear space in the said track on the moving web for a predetermined distance longer than the said predetermined separation between the marks; sensing the presence of the leading mark in the track following the said predetermined distance of clear space; and in response to the recognition of such a mark after the said clear space, conditioning a comparator system to make a register comparison between the positions of the leading mark and a subsequent mark; for each succeeding operation performed on the web, printing a corresponding new register mark ahead of those already printed in the direction of travel of the web so that the said new mark becomes the leading mark, sensing the presence of clear space in the track for a further predetermined distance longer than the predetermined separation between correctly registered marks but shorter than the first predetermined distance by an amount equal to the said predetermined separation, and after recognition of each new leading mark comparing its position with the next mark, the remaining marks being ignored; and making register corrections in response to any register error signals from the said comparator system.

2. A method as defined in claim 1, in which said comparator system is conditioned to make a register comparison only if the mark extends for not more than a predetermined distance in the direction of movement of the web.

3. A method as defined in claim 2, in which said comparator system is conditioned to make a register comparison only if a predetermined length of clear space in the track is sensed in the direction of movement of the web following the said leading mark.

* * * * *